(12) United States Patent
Cox et al.

(10) Patent No.: US 8,832,015 B2
(45) Date of Patent: Sep. 9, 2014

(54) FAST BINARY RULE EXTRACTION FOR LARGE SCALE TEXT DATA

(71) Applicant: SAS Institute Inc., Cary, NC (US)

(72) Inventors: James Allen Cox, Cary, NC (US); Zheng Zhao, Cary, NC (US)

(73) Assignee: SAS Institute Inc., Cary, NC (US)

( * ) Notice: Subject to any disclaimer, the term of this patent is extended or adjusted under 35 U.S.C. 154(b) by 232 days.

(21) Appl. No.: 13/624,052

(22) Filed: Sep. 21, 2012

(65) Prior Publication Data

US 2014/0089247 A1    Mar. 27, 2014

(51) Int. Cl.
G06F 17/00    (2006.01)
G06N 5/02    (2006.01)

(52) U.S. Cl.
USPC ............................. 706/47; 707/812; 707/831

(58) Field of Classification Search
None
See application file for complete search history.

(56) References Cited

U.S. PATENT DOCUMENTS 8,458,232 B1 *  6/2013  Spertus et al. ................ 707/812

OTHER PUBLICATIONS

Cohen, William W., et al., Context-Sensitive Learning Methods for Text Categorization, AT&T Labs, ACM Transactions on Information Systems, vol. 17, No. 2, Apr. 1999, pp. 141-173.
Clark, Peter, et al., The CN2 Induction Algorithm, Machine Learning 3: 1989 Kluwer Academic Publishers—Manufactured in the Netherlands, pp. 261-283.
Huysmans, Johan et al., Using Rule Extraction to Improve the Comprehensibility of Predictive Models, Department of Decision Sciences and Information Management (KBI), pp. 1-55.
Martens, David et al., Rule Extraction from Support Vector Machines: An Overview of Issues and Appplication in Credit Scoring, Studies in Computational Intelligence (SCI), Springer-Verlag Berlin Heidelberg 2008, pp. 1-63.
Magnum Opus: the leading data mining software tool for association discovery, retrieved from http://www.giwebb.com/ on Jun. 26, 2014, 1 page.

* cited by examiner

Primary Examiner — Kakali Chaki
Assistant Examiner — Luis Sitiriche
(74) Attorney, Agent, or Firm — Kilpatrick Townsend & Stockton LLP

(57) ABSTRACT

Systems and methods for identifying data files that have a common characteristic are provided. A plurality of data files including one or more data files having a common characteristic are received. A potential rule is generated by selecting key terms from a list that satisfy a term evaluation metric, and the potential rule is evaluated using a rule evaluation metric. The potential rule is added to the rule set if the rule evaluation metric is satisfied. Based upon the potential rule being added to the rule set, data files covered by the potential rule are removed from the plurality of data files. The potential rule generation and evaluation steps are repeated until a stopping criterion is met. After the stopping criterion has been met, the rule set is used to identify other data files having the common characteristic.

27 Claims, 12 Drawing Sheets

| Rules | Precision | Recall | F1 |
|---|---|---|---|
| t_shr_446 & t_net_445 | 1.000 | 0.482 | 0.651 |
| t_record_345 & t_cts_447 | 0.995 | 0.681 | 0.809 |
| t_year_58 & t_profit_322 & ^t_government_1290 & ^t_country_1236 & ^t_offer_132 | 0.983 | 0.762 | 0.859 |
| t_cts_447 & ^t_price_201 & ^t_offer_132 | 0.978 | 0.818 | 0.891 |
| t_dividend_721 & ^t_price_201 | 0.971 | 0.851 | 0.907 |
| t_year_58 & t_earnings_554 & ^t_export_108 & ^t_investor_5414 | 0.955 | 0.882 | 0.917 |
| t_split_338 & ^t_market_400 | 0.950 | 0.902 | 0.925 |
| t_qtr_454 & ^t_official_1272 | 0.948 | 0.916 | 0.932 |
| t_profit_322 & ^t_economic_2950 & ^t_pct_390 & ^t_quarter_473 | 0.947 | 0.923 | 0.935 |
| t_loss_513 & ^t_government_1290 & t_net_445 | 0.944 | 0.931 | 0.937 |
| t_prefax_profit_5823 & ^t_pct_390 | 0.944 | 0.934 | 0.939 |
| t_profit_322 & t_pre_tax_6871 | 0.942 | 0.939 | 0.941 |
| t_net_445 & ^t_market_400 & t_mln_69 & ^t_last_72 & t_income_819 | 0.940 | 0.945 | 0.943 |
| t_loss_513 & ^t_government_1290 & t_prior_526 | 0.941 | 0.947 | 0.944 |
| t_loss_513 & t_expense_10977 | 0.940 | 0.949 | 0.945 |
| t_div_753 | 0.940 | 0.951 | 0.946 |
| t_billion_nets_1628 | 0.940 | 0.952 | 0.946 |
| t_loss_513 & t_net_loss_946 | 0.939 | 0.954 | 0.947 |
| t_payout_712 | 0.938 | 0.956 | 0.947 |
| t_mln_note_441 | 0.938 | 0.956 | 0.947 |
| t_result_1449 & t_quarter_473 & ^t_government_1290 | 0.935 | 0.961 | 0.948 |
| t_net_profit_506 | 0.935 | 0.961 | 0.948 |
| t_stock_dividend_6984 | 0.934 | 0.962 | 0.948 |

FIG. 7

| Potential Rules | F1 |
|---|---|
| t_earnings_554 & ~t_rate_810 & ~t_export_108 (Precision 0.213) | 0.945 |
| t_loss_513 & ~t_foreign_1228 (Precision 0.110) | 0.930 |
| t_sale_375 & t_gain_457 (Precision 0.184) | 0.943 |
| t_result_1440 & ~t_week_32 (Precision 0.065) | 0.912 |
| t_gain_457 & t_sale_375 (Precision 0.184) | 0.943 |
| t_net_445 (Precision 0.056) | 0.919 |
| t_stock_dividend_6984 (Precision 0.194) | 0.948 |
| t_dividend_721 (Precision 0.133) | 0.945 |
| t_shr_446 (Precision 0.157) | 0.947 |
| t_profit_322 (Precision 0.066) | 0.932 |

Best Rule: t_stock_dividend_6984

| Precision | Recall | F1 |
|---|---|---|
| 0.934 | 0.962 | 0.948 |

FIG. 8

| KEY TERMS IN A RULE | Precision | Improvable |
|---|---|---|
| t_net_445 | 0.177 | TRUE |
| t_net_445 & ~t_market_400 | 0.228 | TRUE |
| t_net_445 & ~t_market_400 & t_mln_69 | 0.298 | TRUE |
| t_net_445 & ~t_market_400 & t_mln_69 & ~t_last_72 | 0.330 | TRUE |
| t_net_445 & ~t_market_400 & t_mln_69 & ~t_last_72 & t_income_819 | 0.453 | FALSE |

FIG. 9

FAST BINARY RULE EXTRACTION FOR LARGE SCALE TEXT DATA

TECHNICAL FIELD

The technology described in this document relates generally to computer-implemented machine-learning algorithms, and more particularly to systems and methods for generating a rule set to identify data files that have a common characteristic.

BACKGROUND

The popularity of the Internet and the availability of nearly-unlimited data storage capacity have caused large amounts of data to be generated. Within the vast amounts of data, much valuable knowledge and information may be available, if it can be located, for example, by computer-implemented statistical and data mining techniques to locate and categorize unknown data files.

SUMMARY

The present disclosure is directed to systems and methods for identifying data files that have a common characteristic. In a method for identifying data files that have a common characteristic, a plurality of data files are received. The plurality of data files include one or more data files having a common characteristic. A list is generated that includes key terms from the plurality of data files, and the list is used to generate a rule set. The rule set is generated using a number of steps. A potential rule is generated by selecting one or more key terms from the list that satisfy a term evaluation metric. The potential rule is evaluated using a rule evaluation metric that determines a relevancy of the potential rule to the one or more data files having the common characteristic and determines an applicability of the potential rule to data not included in the plurality of data files. The potential rule is added to the rule set if the rule evaluation metric is satisfied. Based upon the potential rule being added to the rule set, data files covered by the potential rule are removed from the plurality of data files. The potential rule generation and evaluation steps are repeated until a stopping criterion is met. After the stopping criterion has been met, the rule set is used to identify other data files that have the common characteristic.

In another embodiment, a system for identifying data files that have a common characteristic includes one or more processors and one or more non-transitory computer-readable storage mediums containing instructions. The instructions are configured to cause the one or more processors to perform operations including receiving a plurality of data files, where the plurality of data files include one or more data files having a common characteristic. A list is generated that includes key terms from the plurality of data files, and the list is used to generate a rule set. The rule set is generated using a number of steps. A potential rule is generated by selecting one or more key terms from the list that satisfy a term evaluation metric. The potential rule is evaluated using a rule evaluation metric that determines a relevancy of the potential rule to the one or more data files having the common characteristic and determines an applicability of the potential rule to data not included in the plurality of data files. The potential rule is added to the rule set if the rule evaluation metric is satisfied. Based upon the potential rule being added to the rule set, data files covered by the potential rule are removed from the plurality of data files. The potential rule generation and evaluation steps are repeated until a stopping criterion is met. After the stopping criterion has been met, the rule set is used to identify other data files that have the common characteristic.

In yet another embodiment, a non-transitory computer program product for identifying data files that have a common characteristic is tangibly embodied in a machine-readable non-transitory storage medium. The non-transitory computer program product includes instructions configured to cause a data processing system to perform operations including receiving a plurality of data files, where the plurality of data files include one or more data files having a common characteristic. A list is generated that includes key terms from the plurality of data files, and the list is used to generate the rule set. The rule set is generated using a number of steps. A potential rule is generated by selecting one or more key terms from the list that satisfy a term evaluation metric. The potential rule is evaluated using a rule evaluation metric that determines a relevancy of the potential rule to the one or more data files having the common characteristic and determines an applicability of the potential rule to data not included in the plurality of data files. The potential rule is added to the rule set if the rule evaluation metric is satisfied. Based upon the potential rule being added to the rule set, data files covered by the potential rule are removed from the plurality of data files. The potential rule generation and evaluation steps are repeated until a stopping criterion is met. After the stopping criterion has been met, the rule set is used to identify other data files that have the common characteristic.

BRIEF DESCRIPTION OF THE FIGURES

FIG. 7 is a table depicting a generation of a rule set by adding rules one-at-a-time to the rule set.

FIG. 8 is a table depicting a number of potential rules for a rule set and a selection of a particular potential rule for the rule set.

FIG. 9 is a table depicting an addition of terms to a rule and a satisfaction of a stopping criterion to discontinue the addition of terms.

DETAILED DESCRIPTION

Figure 1A:
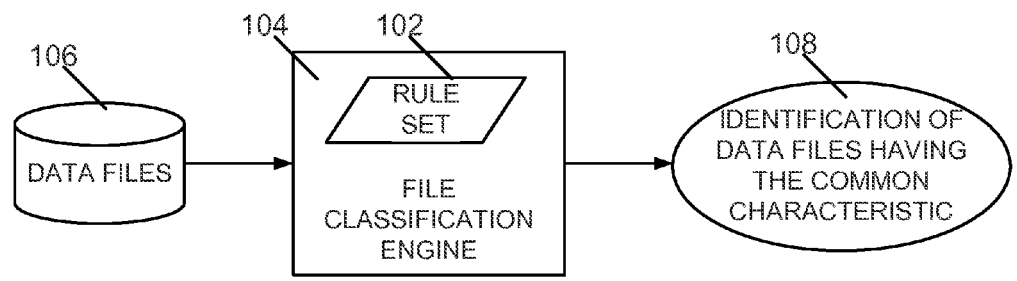
FIGS. 1A and 1B depict example applications of a rule set generated by a rule generation engine.
Figure 1B:
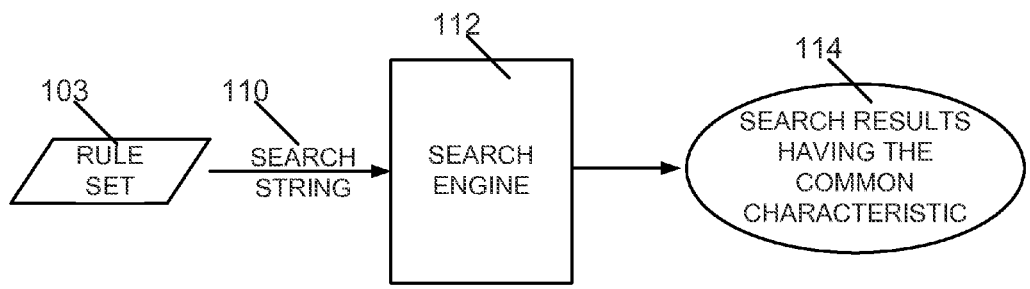

FIGS. 1A and 1B depict example applications of a rule set 102 generated by a rule generation engine. In FIG. 1A, the rule set 102 is used as a component of a computer-implemented file classification engine 104. The computer-implemented file classification engine 104 may be used to automatically classify data files 106 under one or more different categories. Multiple data files classified under a particular category may thus have a common characteristic (i.e., a common subject matter). The rule set 102 used as part of the file classification engine 104 includes one or more rules configured to identify features of the data files 106 that are relevant to or typical of data files having the common characteristic. The file classification engine 104 receives as inputs the unknown, unclassified data files 106 (e.g., articles, book chapters, webpages, reports containing financial data, medical histories, reports containing genetic data for an individual). As output, the classification engine 104 generates one or more binary classifications for the input data files. The binary classifications are used to produce an output identifying which data files of the unknown, unlabeled data files 106 have a common characteristic 108. For example, a file classification engine related to financial markets may receive as inputs random, unlabeled newspaper articles related to a variety of topics, and for each article, the classification engine may produce an output indicating whether the article relates to financial markets or not. The file classification engine related to financial markets may also be capable of producing more specific binary classifications (i.e., whether a given article relates to a particular market, such as the New York Stock Exchange). Using such a computer-implemented file classification engine, relevant newspaper articles can be located automatically, without a need for human intervention or requiring only minimal human intervention.

FIG. 1B depicts use of a rule set 103 to generate search strings 110 to be input into a search engine 112. The rule set 103 may include multiple individual rules, and each of the individual rules may function as a separate search string for the search engine 112. Alternatively, the multiple individual rules of the rule set 103 may be collectively included in the search string 110, with the different rules linked by "OR" operators, for example. Using the search string 110, the search engine 112 returns search results that possess a common characteristic 114. Use of the rule set 103 in this manner may be an efficient method of locating relevant documents on the Internet because the search string 110 based on the rule set 103 identifies key features that have previously been shown to be relevant to the common characteristic.

Figure 2:
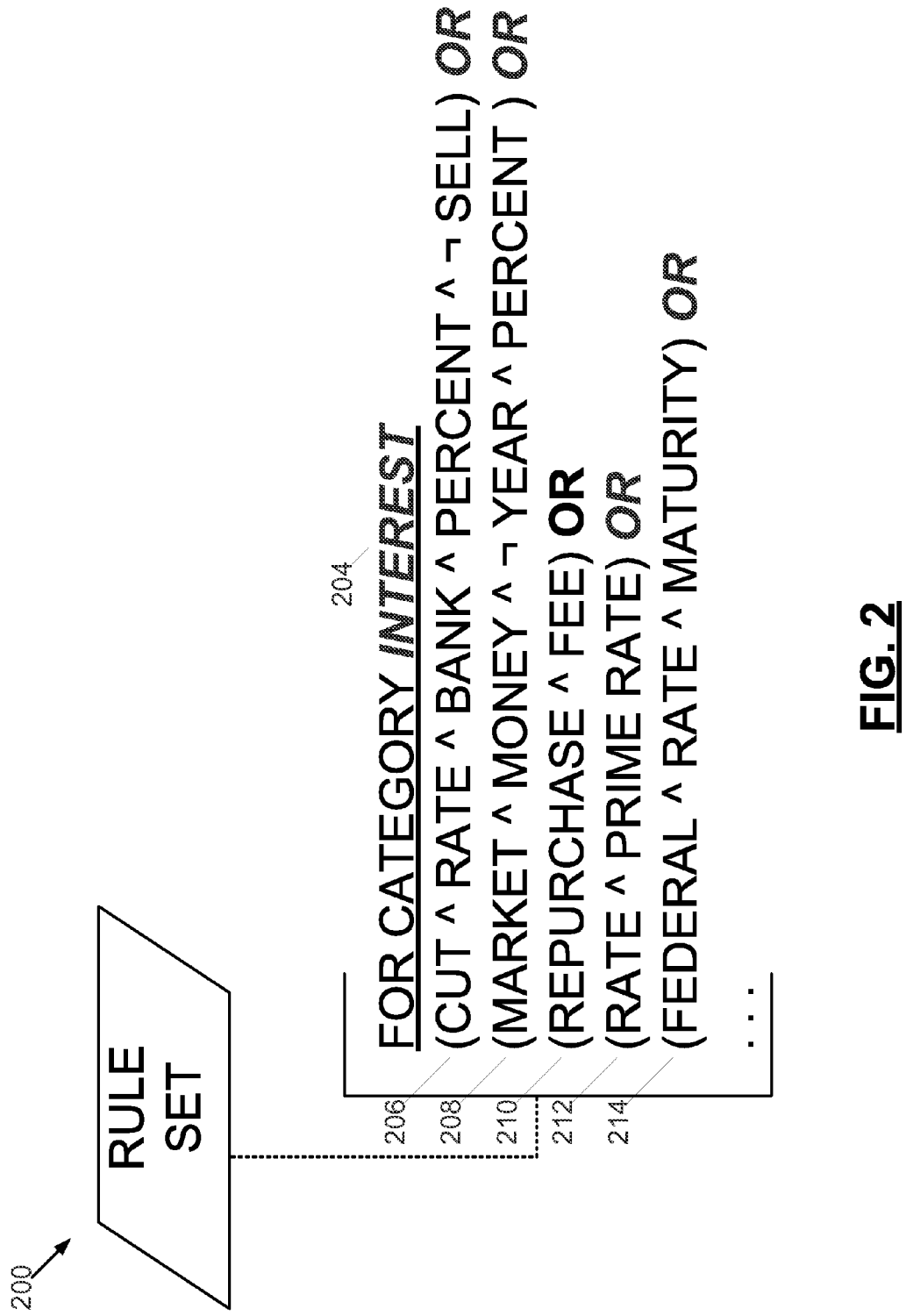
FIG. 2 depicts an example rule set used as part of a computer-implemented file classification engine.

FIG. 2 depicts an example rule set 200 used as part of a computer-implemented file classification engine. In FIG. 2, the rule set 200 is configured to make a binary determination as to whether an unknown, unlabeled file should be classified under a category "interest" 204. The rule set 200 of FIG. 2 includes multiple individual rules 206, 208, 210, 212, 214 conjoined by "OR" operators, such that an unlabeled file that satisfies at least one of the individual rules 206, 208, 210, 212, 214 is classified under the category "interest" 204. The individual rules 206, 208, 210, 212, 214 each include key terms linked by "AND" operators (denoted in FIG. 2 by the "^" symbol). Thus, a particular individual rule is satisfied only if each of its terms is satisfied in the unknown, unlabeled file. Further, particular rule terms are subject to the "NOT" operator (denoted by the "¬" symbol in FIG. 2), thus requiring that such particular terms not be found in the unlabeled file. Thus, for example, a particular file would be classified under the category "interest" 204 if it satisfies the rule 206 by including the words "cut," "rate," "bank," and "percent," and not including the word "sell." Further, if all terms of the rule 206 are not satisfied, the particular file may nevertheless still be classified under the category "interest," if one of the other rules 208, 210, 212, 214 are satisfied. In the example rule set 200, the terms included in the rules 206, 208, 210, 212, 214 may appear in any order and in any location in the unlabeled file.

To build a rule set similar to the example rule set 200 of FIG. 2, training data may be used to train a rule generation engine, which may be used to generate the rule set. The training data may include documents that have been manually reviewed by one or more humans or documents that have been reviewed using a computer algorithm. In one example, the one or more humans manually review training data documents and assign labels (i.e., categories, classifications) to the documents, indicating that documents labeled similarly have a common characteristic. With reference to the example of FIG. 2, the one or more humans may review a plurality of articles, and for each article, determine whether it relates to "interest" or not. By receiving and analyzing the human-labeled training documents, the rule generation engine may identify features of the training documents that are indicative of a document's relationship to a particular category. These identified features may be used to generate rule sets similar to that depicted in FIG. 2.

With reference again to FIG. 2, an example training of a rule generation engine may be performed as follows. The rule generation engine receives a set of labeled data files, where certain of the labeled data files are labeled as relating to the category "interest" 204 and certain of the labeled data files are labeled as not relating to the category. The data files may have been labeled as such by humans or by a computer algorithm. The rule generation engine analyzes the labeled files and may determine that when a document contains the terms "repurchase" and "fee" (as in rule 210 of FIG. 2), the document is always or nearly always labeled as being related to the "interest" category 204. Thus, the rule generation engine generates a rule 210: if an unknown, unlabeled document contains the terms "repurchase" and "fee," then categorize it as relating to the "interest" category 204. Other rules 206, 208, 212, 214 may be generated in this manner and conjoined to the rule set 200 using "OR" operators. The rule set 200 created by the rule generation engine may thereafter be used to determine whether future unknown, unlabeled files should be classified under the "interest" category 204 (e.g., as part of a file classification engine).

Figure 3:
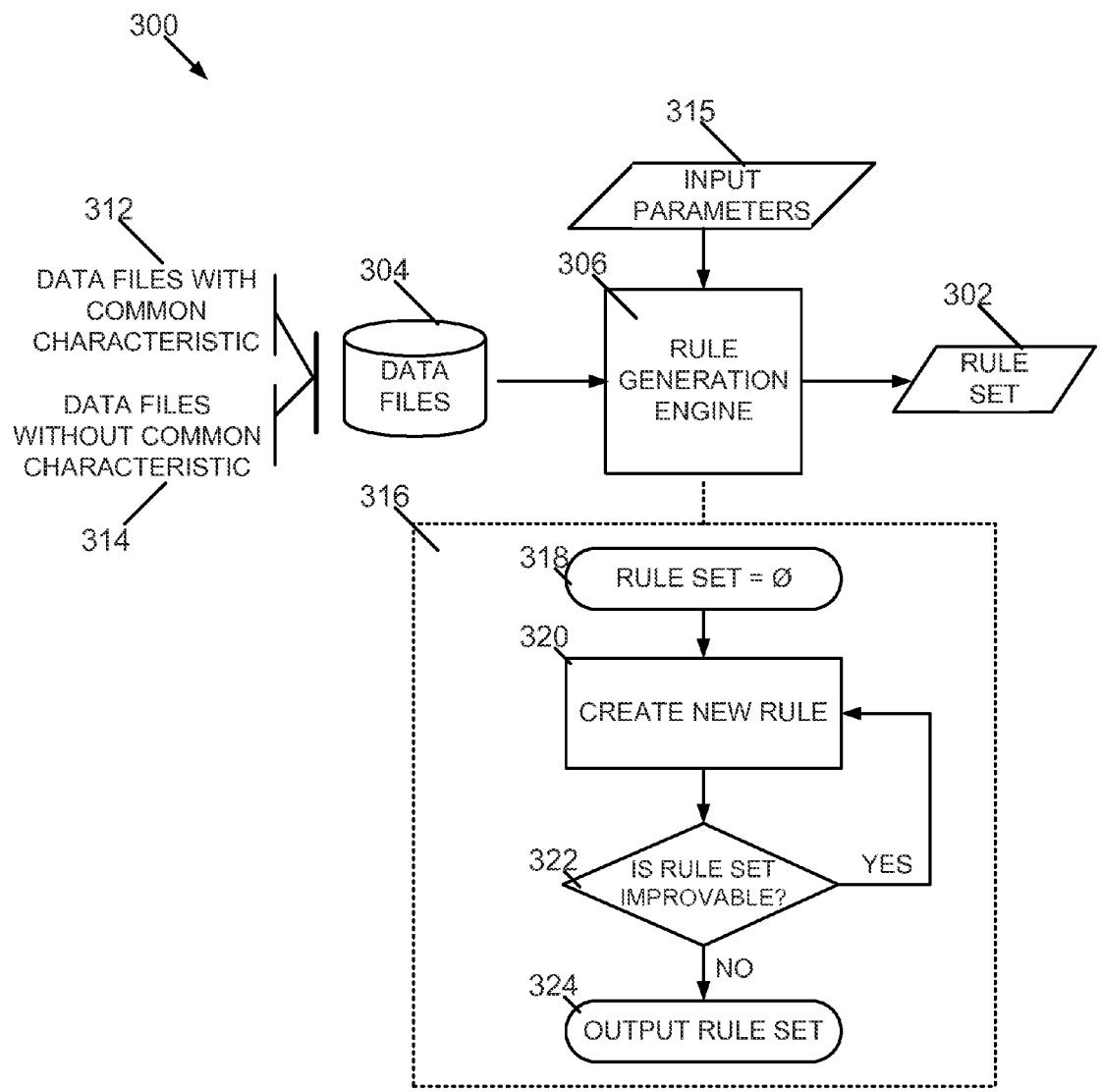
FIG. 3 is a block diagram of an example system for generating a rule set from a plurality of labeled data files.

FIG. 3 is a block diagram of an example system 300 for generating a rule set 302 from a plurality of labeled data files 304. In FIG. 3, the data files 304 may have been labeled by humans or a computer as relating to one or more categories and are used as training data for a rule generation engine 306. The data files 304 may include documents of various types (e.g., text documents, documents containing financial data, documents containing medical data). The labels applied to the data files 304 (e.g., by a human or a computer) identify certain data files as having a common characteristic 312 (i.e., they would be classified under a common category) and certain data files as not having the common characteristic 314. The common characteristic may vary across different document types. As illustrated in the example of FIG. 2, the common characteristic may be a particular subject matter for textual documents (i.e., all of the textual documents have a common theme or focus on a particular topic). In another example where the data files 304 relate to financial information, the common characteristic may be an indication that a particular person is likely to default on a loan. Further, the common characteristic of the pre-labeled data files 304 may be defined broadly or narrowly. For example, the common characteristic can be that a document relates to sports, generally, or alternatively, the common characteristic can be that a document relates to a particular sporting event or to a particular athlete.

The labeled data files 304 and input parameters 315 may be received by the rule generation engine 306 and analyzed to generate the rule set 302. In particular, the rule generation engine 306 may perform steps 316 to generate the rule set 302. The steps 316 may include an iterative process whereby the rule set 302 is generated by adding rules one rule at a time until a stopping criterion is met. At 318, the steps 316 begin with a null rule set containing no rules. At 320, a new rule is created and added to the null rule set. As described in further detail below, the rules may be created based on the labeled data files 304 functioning as training data, such that the rule generation engine learns rules by analyzing features of the data files having the common characteristic 312 and not having the common characteristic 314. At 322, the stopping criterion is evaluated, where a determination is made as to whether the rule set is improvable. The evaluation of the stopping criterion 322 occurs after the addition of each and every rule in the iterative process 316. The stopping criterion determination 322 may be based, for example, on a precision and a recall of the rule set (e.g., an F1 score that is a harmonic mean of the precision and recall of the rule set) and whether adding an additional rule could improve the rule set when evaluating it under these measures.

If the rule set is improvable, another rule is created and added to the rule set at 320. As illustrated in the example of FIG. 2, the rule set 302 may be of a disjunctive normal form (DNF). The disjunctive normal form causes rules added to the rule set 302 to be linked by "OR" operators and the selected key terms of each rule to be linked by "AND" operators. The iterative process of adding rules to the rule set 320 one rule at a time and checking the stopping criterion 322 continues until the rule set is not improvable, such that at 324, the rule set 302 is output. As described in further detail below, the iterative process steps 318, 320, 322, 324 may utilize the input parameters 315 and data files 304 received by the rule generation engine 306 in creating and evaluating potential rules for the rule set 302. In particular, distinctions between the data files labeled as possessing the common characteristic 312 and those labeled as not possessing the common characteristic 314 are analyzed to determine if a potential rule satisfies a rule evaluation metric. The rule evaluation metric may determine a relevancy of the potential rule to the data files labeled as possessing the common characteristic 312. Input parameters 315 may be used, for example, to determine if the relevancy of the potential rule to the data files labeled as possessing the common characteristic 312 meets a baseline amount of relevancy required by the rule evaluation metric.

Figure 4:
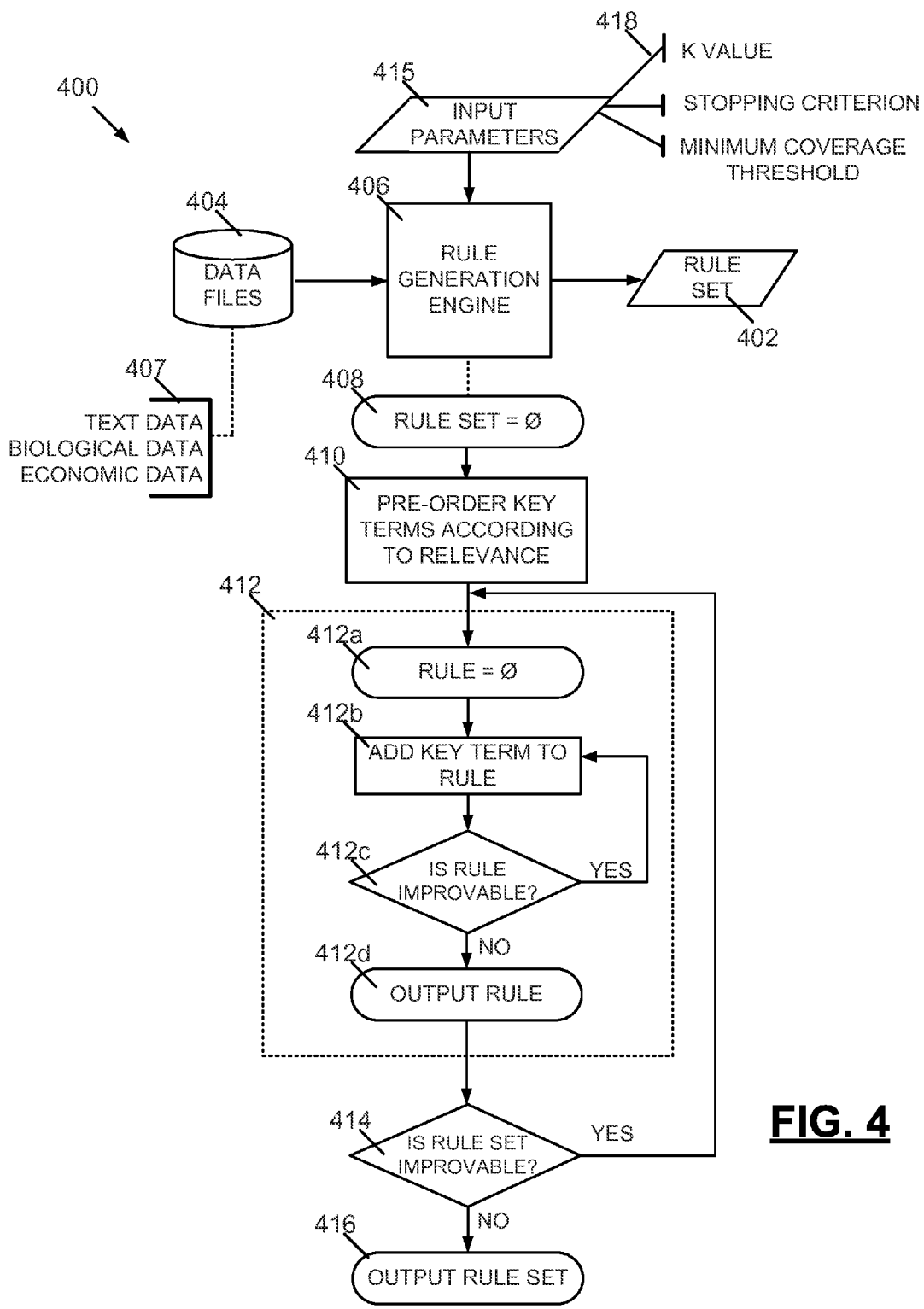
FIG. 4 is a block diagram of another example system for generating a rule set from a plurality of labeled data files.

FIG. 4 is a block diagram of another example system 400 for generating a rule set 402 from a plurality of labeled data files 404. Similar to FIG. 3, the labeled data files 404 are used as training data for a rule generation engine 406, with certain of the data files 404 being labeled as relating to a particular common characteristic (i.e., category) and certain of the data files being labeled as not relating to the particular common characteristic. As in the example system of FIG. 3, the rule generation engine 406 uses the labels to identify features (i.e., words, numbers, purchases, patterns, genes, medical data) indicating that a particular data file is related to the common characteristic.

The labeled data files 404 of FIG. 4 may be of different types and may include, for example, text data, biological data, and/or economic data 407. The particular type of data included in the data files 404 affects the function that the rule set 402 is configured to perform. For example, if the data files 404 include text documents (i.e., articles, webpages), the rule set may be configured to perform a text categorization function and/or to generate search strings for a search engine, as illustrated in FIGS. 1A and 1B. If the data files 404 include biological data, the rule set 402 may be configured to make a determination as to whether an individual is likely to develop a particular medical condition. When the data files 404 include such biological data, rules in the rule set 402 may include DNA data, RNA data, or genomic data. If the data files 404 include economic data, the rule set 402 may be configured to make a determination as to whether an individual is likely to purchase an item or default on a loan. When the data files 404 include such economic data, the rules included in the rule set 402 may include purchasing data, stock market data, financial data, loan data, or credit history data. The data files 404 may be data encoded in a sparse format. Thus, aside from the text data, biological data, and economic data 407 illustrated in FIG. 4, the data files 404 may include other types of sparse data.

Using the labeled data files 404 as input, the rule generation engine 406 may perform steps 408 through 416 to generate the rule set 402. The steps 408 through 416 include two main processes, one being a rule set generation process and the other being a rule generation process 412. Both of the main processes may be iterative processes, and the rule generation process 412 may be a nested, inner process that occurs within an iteration of the outer, rule set generation process. In the rule set generation process, rules are generated one rule at a time, and after a generated rule has been added to the rule set 402, a first stopping criterion is evaluated to determine if rule generation steps should be repeated to add another rule to the rule set 402. Similarly, the rule generation process is used to join terms together to generate a single rule, and this process may involve adding terms to the rule one term at a time and evaluating a second stopping criterion to determine if further terms should be added to the rule.

At 408, the rule set generation process begins with a null rule set containing no rules. At 410, prior to generating a rule, a set of key terms are ordered based on each key term's relevance to a particular common characteristic (i.e., category, classification). The key terms may be words, phrases, numbers, amounts of money, or genes, for example, and may have been extracted from the labeled data files 404 or generated from other, external sources. From the ordered list of key terms, key terms are selected and included as constituent parts of a rule. The ordering based on relevance performed in the step 410 is used such that when generating a rule, the most promising terms may be evaluated first.

At 412, steps of the rule generation process are used to generate a single rule. The rule generated as a result of the rule generation steps 412 may be added to the rule set 402 if it satisfies a particular rule evaluation metric. If the generated rule satisfies the rule evaluation metric and is added to the rule set 402, at 414, a determination is made as to whether the rule set 402 is improvable (i.e., whether adding another rule to the rule set 402 could potentially increase a performance of the rule set). If the rule set 402 is determined to be improvable, the steps 412 of the rule generation procedure are performed again to add another rule to the rule set 402. In this way, the rule generation process is an iterative process, where rules are added one at a time to the rule set 402, and the process is repeated only if a stopping condition is not met. If the rule set is determined to be not improvable (i.e., the stopping condition is met), at 416, the rule set 402 is output.

The steps 412 of the rule generation process, which are used to generate a single rule to be potentially added to the rule set 402, also include an iterative process. The iterative process of the rule generation steps 412 form a nested, iterative process within the outer steps of the iterative rule set generation process. At 412a, the rule generation process begins with a null rule containing no terms. At 412b, a key term from the ordered list of key terms is added to the null rule. As described in further detail below with respect to FIG. 6, the key term is added to the rule only if it satisfies a term evaluation metric. At 412c, after adding the key term to the rule, a determination is made as to whether the rule is improvable (i.e., whether adding additional key terms could potentially improve a performance of the rule). If the rule is improvable, another key term is added to the rule at 412b. If the rule is not improvable, at 412d, the rule is output. As noted above with respect to the rule set generation steps, the generated rule is added to the rule set 402 only if it satisfies the rule evaluation metric.

One or more input parameters 415 received by the rule generation engine 406 may affect the execution of the rule set generation steps and the rule generation steps. The input parameters 415 may include, for example, a "k" value, a stopping criterion, and/or a minimum coverage threshold 418. The k value may be used to implement a "k-best" search strategy for adding rules to a rule set and for adding terms to a rule. As described in greater detail below with respect to FIGS. 5 and 6, a rule or term may be included in a rule set only if it is better than a predetermined number of other rules or terms, respectively. Thus, the variable k included in the input parameters may be used to specify this predetermined number of other rules or terms. The stopping criterion value of the input parameters 415 may define under what conditions the iterative rule set and rule generation processes are to be exited. For example, for the rule set generation process, the stopping criterion may specify that if a performance of the rule set would not improve by at least a particular amount by adding another rule, then further rules should not be added to the rule set, and the iterative rule set generation process should be exited. The minimum coverage threshold variable of the input parameters 415 may be used to ensure that a rule to be added to the rule set 402 covers a predetermined number of data files. By requiring that the minimum coverage threshold is met, overfitting and overly-specific rules that do not generalize well to different data files may be avoided.

Other input parameters 415 that may be used in the system 400 include an m-estimate value and a maximum p-value parameter. The m-estimate value is used to estimate how much a distribution of a term changes between training and test data. This value is used to adjust for selection bias by punishing long rules (i.e., rules with many terms included) and rules that contain terms that occur rarely and that may not generalize well to data from different sources. The m-estimate value is thus used to handle noise in input data and to avoid overfitting of the input data by taking into account an applicability of a potential rule to data not included in the input data. The maximum p-value parameter is a maximum p-value for considering a term as a rule or for adding a term to an existing rule, where the p-value refers to a probability that a term is not relevant in determining whether a document should be identified as having a common characteristic. In some examples, the maximum p-value parameter has a value of between 0.01 to 0.000001.

Figure 5:
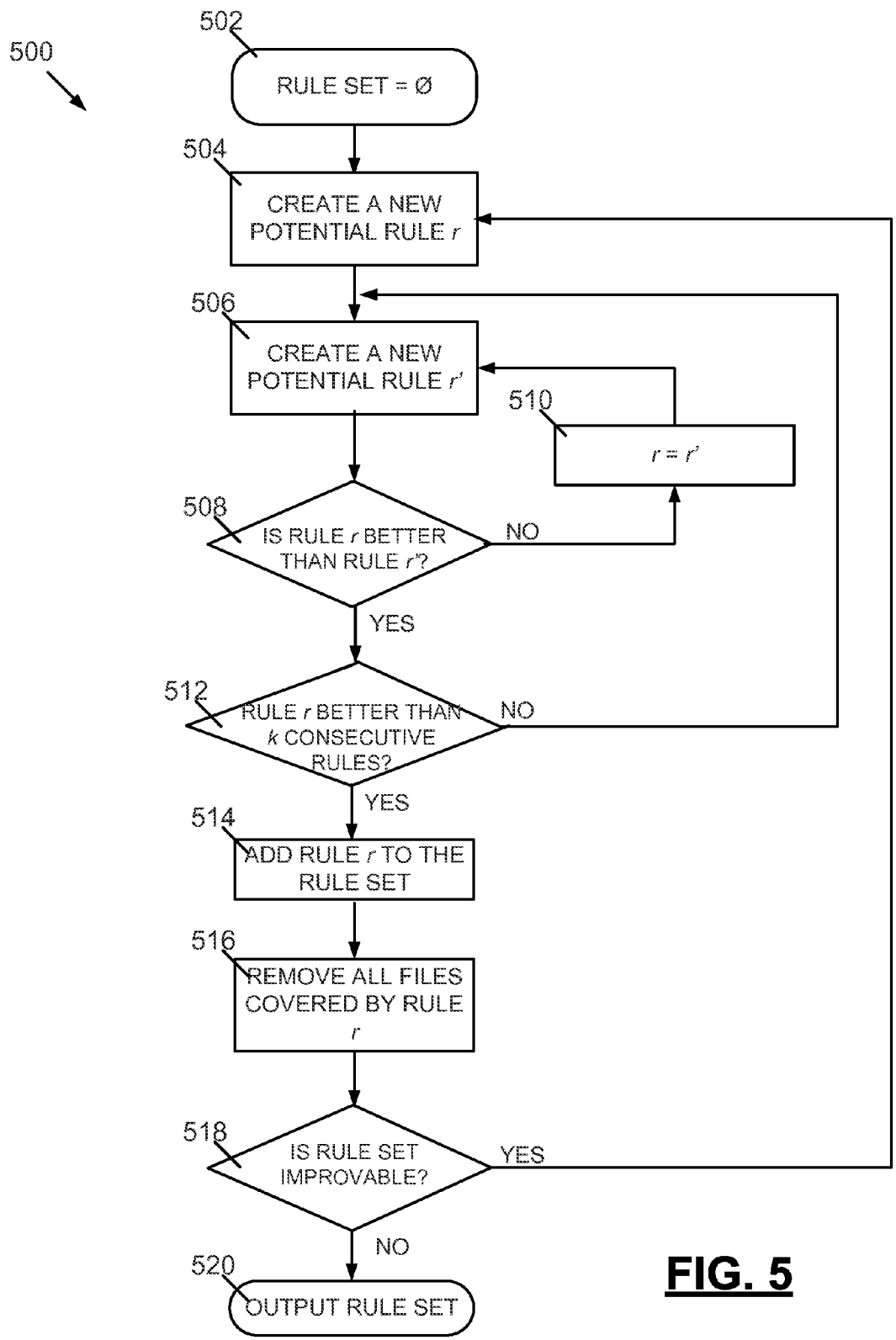
FIG. 5 is a flowchart depicting example steps of a rule set generation process used to generate a rule set.

FIG. 5 is a flowchart depicting example steps of a rule set generation process 500 used to generate a rule set. The rule set generation steps define an iterative process, where rules are generated and added to the rule set one at a time, and the rule generation steps are thereafter repeated only if a stopping criterion is not met. As described in further detail below, the rule set generation process is based on a k-best search scheme, where a particular rule is added to the rule set only if it is better than k consecutive rules generated after the generation of the particular rule.

The rule set generation process of FIG. 5 begins at 502 with a null rule set containing no rules. At 504, a potential rule r is generated, and at 506, a potential rule r' is generated. Potential rules r and r' may be generated, for example, using the rule generation process described below with respect to FIG. 6. Potential rules r and r' may each be added to the rule set if they each satisfy a rule evaluation metric. The rule evaluation metric may be used to evaluate a relevancy of the potential rules r and r' to a set of training data containing one or more data files having a common characteristic and one or more data files not having the common characteristic.

Steps of the rule evaluation metric begin at 508, where a determination is made as to whether rule r is better than rule r'. Rule r is better than rule r' if rule r has a higher rule relevancy to the one or more data files having the common characteristic. The rule relevancy of the potential rule may be based on a precision and a recall of a rule set including the potential rule. The precision of a rule set may be defined according to:

$$Precision = tp/(tp+fp),$$

where tp is a true positive and fp is a false positive produced by the rule when being evaluated using training data. Thus, generally, the precision refers to the fraction of training data documents classified by a rule that have been classified correctly. The recall of a rule set may be defined according to:

$$Recall = tp/(tp+fn),$$

where fn is a false negative produced by the rule when being evaluated using training data, and tp is defined as above. Recall thus refers to the fraction of relevant training data documents that were identified by the rule.

In one example, the rule relevancy of a potential rule is based on an F1 score, where the F1 score is a harmonic mean of the precision and the recall and may be defined according to:

$$F1 = 2 \cdot (precision \cdot recall)/(precision + recall).$$

In this example, rule r is better than rule r' only if rule r has a higher F1 score than rule r'.

If rule r is determined at 508 to not be better than rule r', at 510, variable r is set equal to variable r', and a new potential rule r' is generated at 506. In this manner, because rule r was determined to not be better than rule r', original rule r is effectively removed from further consideration for inclusion in the rule set. Original rule r' (now labeled as rule r after step 510) is then evaluated under the steps of the rule evaluation metric, beginning at 508 with its comparison to the new potential rule r'.

If potential rule r is determined to be better than potential rule r', at 512, a determination is made as to whether potential rule r is better than k consecutive potential rules that were generated subsequent to the generation of rule r. Step 512 thus implements a "k-best" search strategy, where the potential rule r will be added to the rule set only if it is better than k consecutive rules generated after the generation of the potential rule r. The k-best determination as to whether potential rule r is better than k consecutive rules may be based on the F1 score described above, where the F1 score is a harmonic mean of the precision and the recall of the rule set. If the potential rule r has not been compared to and determined to be better than k consecutive rules generated subsequent to its generation, the process returns to step 506, where a new potential rule r' is generated and subsequently compared to potential rule r at 508.

After potential rule r has been compared to and determined to be better than k consecutive rules at 512, potential rule r is added to the rule set at 514. At 516, after adding the rule r to the rule set, all of the files of the training data files that are covered by the potential rule r are removed from the set of training data files. Files covered by potential rule r may include those files that would be identified as possessing the common characteristic by the rule r, as well as those that would be affirmatively identified as not possessing the common characteristic by the rule r.

After adding the rule r to the rule set and removing data files covered by the rule r, at 518, a determination is made as to whether the rule set is improvable. This determination may function as a stopping criterion for the rule set generation process, such that subsequent rules are added to the rule set only if the stopping criterion is not met. The determination 518 as to whether the rule set is improvable may be based on the rule set's F1 score. In one example, the rule set may be determined to be not improvable when adding another rule cannot produce a statistically significant improvement in the rule set's F1 score. The stopping criterion may be adjusted based on a precision required by an application or based on other characteristics of the application. If the rule set is determined to be improvable, a new potential rule r is generated at 504, and the steps of the rule evaluation process are repeated. If the rule set is determined to not be improvable, the rule set is output at 520.

In some examples, the stopping criterion is based on an adjusted F1 score, where the adjusted F1 score is the harmonic mean of adjusted precision and adjusted recall. The adjusted precision value is defined according to the following equation:

Adjusted_precision=(*tp+m*_estimate\**cat_frequency*)/
(*tp+fp+m*_estimate), where the m-estimate value estimates how much a distribution of a term changes between training and test data and cat_frequency is the sample occurrence of a category under consideration. The adjusted recall value is defined according to the following equation:

Adjusted_recall=(*tp+m*_estimate\**cat_frequency*)/(*tp+
fn+m*_estimate).

The adjusted F1 score is defined according to the following equation:

F1_adj=2·(adjusted_precision·adjusted_recall)/(adjusted_precision+adjusted_recall).

When the stopping criterion is based on the adjusted F1 score, the rule set is determined to be not improvable when adding another rule cannot produce an improvement in the rule set's F1_adj score.

Figure 6:
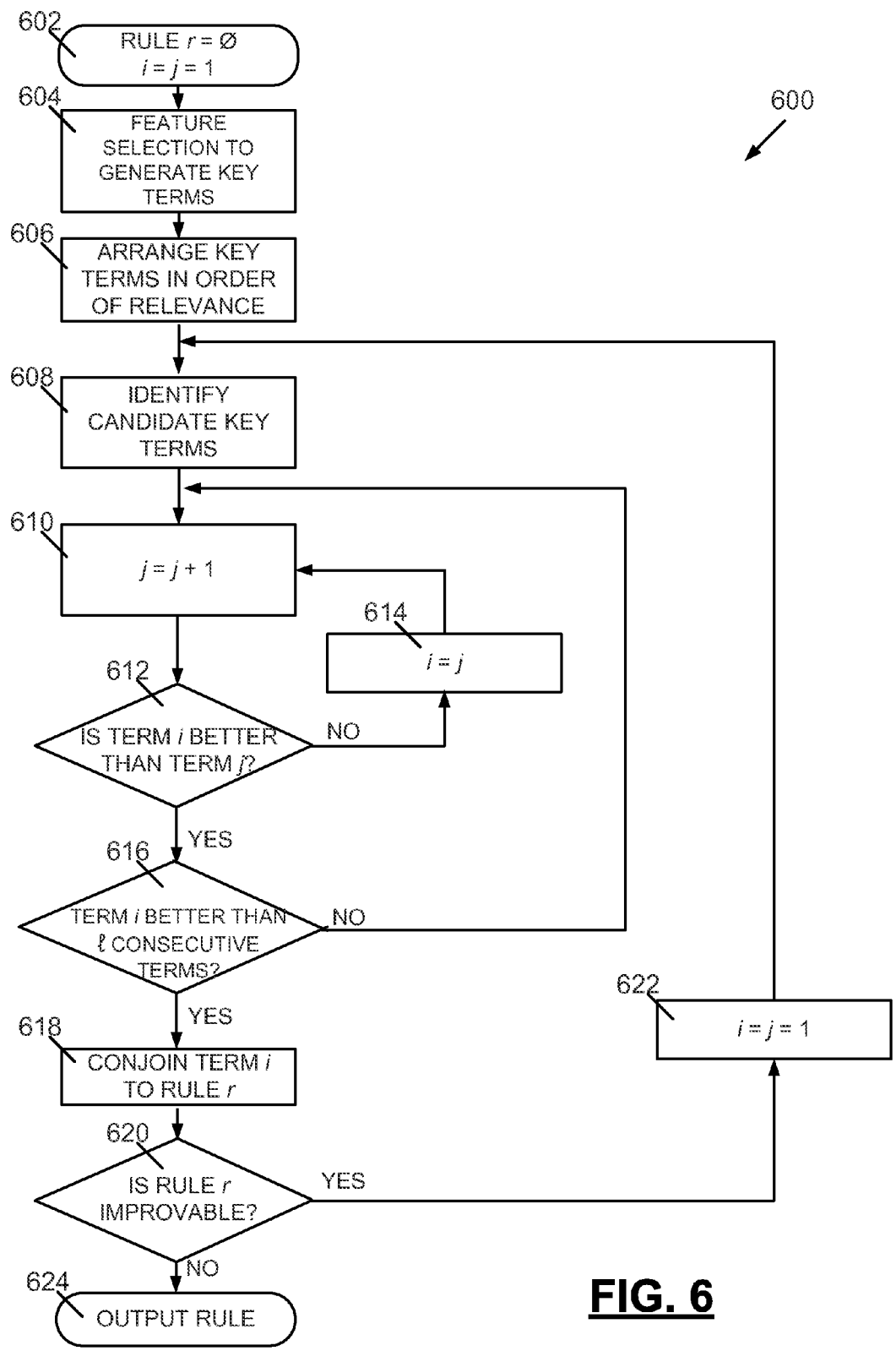
FIG. 6 is a flowchart depicting example steps of a rule generation process used to generate a potential rule for inclusion in a rule set.

FIG. 6 is a flowchart depicting example steps of a rule generation process 600 used to generate a potential rule for inclusion in a rule set. With reference to FIG. 5, steps 504 and 506 require the generation of potential rules r and r', respectively. These rule generation steps 504, 506 may each utilize steps 602 through 624 of FIG. 6, which together define an iterative rule generation process. Thus, the iterative rule generation steps 602 through 624 of FIG. 6 may function as a nested inner loop of the iterative rule set generation process illustrated in FIG. 5.

The rule generation process 600 of FIG. 6 begins at 602 with a null rule including no terms. At 602, variables i and j, used throughout the steps of FIG. 6, are both set equal to one. At 604, a feature selection step is performed in order to generate key terms to be included in rules. A rule includes one or more key terms, where each of the key terms of the rule is linked by "AND" operators. Thus, to generate rules, key terms that can potentially be included in the rules are first generated. In one example, the feature selection step 604 may be performed by extracting all words, numbers, symbols, and/or other data pieces from the training data files (e.g., data files 304 of FIG. 3, data files 404 of FIG. 4). For example, when the training data files used for generating the rule set consist of English-language text, the feature selection step 604 may simply extract and isolate all words from the training data files, such that each word may thereafter be a key term that could potentially be added to a rule.

At 606, the generated key terms are ordered based on each term's relevance to a particular common characteristic of the training data files (i.e., a category or classification). In one example, a key term's relevance to the common characteristic may be based on an information gain or g-score metric. Information gain may be defined according to:

$$\text{Gain}(r_{i+1}, r_i) = T_{i+1}^+ \cdot \left(-\log_2 \frac{T_i^+}{T_i^+ + T_i^-} + \log_2 \frac{T_{i+1}^+}{T_{i+1}^+ + T_{i+1}^-}\right),$$

where $T_i^+$ is the number of positive examples of the training data files covered by the list with the addition of a particular key term to the list, and $T_i^-$ is the number of negative examples of the training data files covered by the list with the addition of the particular key term to the list. The g-score is a likelihood ratio statistic that may be defined according to:

$$G = 2\sum_i O_i \log\left(\frac{O_i}{E_i}\right),$$

where $O_i$ is a number of observed examples of the training data files covered by the list, and $E_i$ is a number of expected examples of the training data files covered by the list. Terms that have a higher information gain or g-score with respect to the common characteristic may be determined as being of higher relevance to the common characteristic and may be ordered higher within the list. Pre-ordering key terms in this manner may ensure that the most promising terms are evaluated first and help to avoid missing suitable terms for a rule. At 608, candidate key terms are identified from the list. This step may be used to identify a starting place within the list. For example, upon an initial iteration of the steps of FIG. 6, the candidate terms will be those terms ordered highest within the list. However, upon subsequent iterations, with the terms ordered highest within the list previously evaluated, the candidate terms to be evaluated in a particular iteration may be found lower in the list.

To begin the rule generation process, at 610, variable j is incremented by 1. Variables i and j in FIG. 6 may be index numbers that refer to particular positions within the list of key terms. Thus, following step 610, with variable i equal to 1, and variable j equal to 2, term i may refer to a term at position 1 in the list (i.e., the term determined to be most relevant to the category or classification based on information gain or g-score), and term j may refer to a term at position 2 in the list. Terms i and j may each be part of a generated rule if they each satisfy a term evaluation metric. The term evaluation metric is used to evaluate a relevancy of the terms i and j to a set of training data containing one or more data files having a common characteristic and one or more data files not having the common characteristic.

At 612, a determination is made as to whether term i is better than term j. Term i is better than term j if term i has a higher term relevancy to the one or more data files having the common characteristic. Term relevancy may be based on one or more criteria. In one example, the term relevancy is based on a combined criteria, where a first term is better than a second term if (1) the addition of the first term to the rule results in a rule with a statistically significant higher g-score than a rule created by adding the second term, (2) the addition of the first term to the rule results in a rule that meets a minimal coverage requirement, and (3) the addition of the first term to the rule results in a rule with a higher precision than a rule created by adding the second term. In another example, the term relevancy of a particular term is based on a precision or purity of a rule including the potential term, where the purity of the rule is a measure derived from the precision of the rule that is based on a presumed error measure in the precision.

If term i is determined at 612 to not be better than term j, at 614, variable i is set equal to variable j, and j is again incremented by a value of 1 at 610. Thus, because term i was determined to not be better than term j, original term i is effectively removed from further consideration for inclusion in the rule. Original term j (now labeled as term i after step 614) is then evaluated under the steps of the term evaluation metric, beginning at 612 with its comparison to the new term j.

If term i is determined at 612 to be better than term j, at 616, a determination is made as to whether term i is better than l consecutive terms in the ordered list. Similar to the "k-best" search strategy used in the rule set generation process of FIG. 5, the rule generation process of FIG. 6 utilizes an "l-best" search strategy, where the term i will be conjoined to the rule r only if it is better than l consecutive terms following it in the ordered list. The l-best determination as to whether term i is better than l consecutive terms may be based on the same measures described above with respect to step 612. If the potential term i has not been compared to and determined to better than l consecutive terms following it in the list, the process returns to step 610, where variable j is incremented and the new term j is subsequently compared to term i at 612. The l-best search strategy may be used to reduce the size of the search space and to disallow term addition that does not provide a statistically significant improvement in the rule.

Aside from the l-best search strategy criterion for adding rules, further rule criteria may be applied. For example, an "m-estimate" criterion may be used to adjust for selection bias by punishing long rules (i.e., rules with many terms included) and rules that contain terms that occur rarely and that may not generalize well to data from different sources. The m-estimate criterion accomplishes this by estimating how much a distribution of a term changes between training and test data and by adjusting the calculated precision value based on this determination. The m-estimate value is thus used to handle noise in input data and to avoid overfitting of the input data by taking into account an applicability of a potential rule to data not included in the input data. An adjusted precision value, calculated using the m-estimate value, is defined according to the following equation:

$$\text{Adjusted\_precision} = (tp + m\_estimate * cat\_frequency) / (tp + fp + m\_estimate),$$

where tp is a number of items correctly categorized by a rule (i.e., true positive), fp is a number of items incorrectly categorized by the rule (i.e., false positive), and cat_frequency is a sample occurrence for a category under consideration. The m-estimate value is generally an integer of 1 or greater, and in some examples, an m-estimate value of between 2 and 32 is used.

Additionally, a minimal positive document coverage criterion may be applied to a rule before adding it to the rule set. This criterion may require a rule to cover at least a predefined number of positive documents, which may help to avoid generating over-specific rules. This criterion may also effectively shorten the search path and improve generalization of the created rules.

After term i has been compared to and determined to be better than l consecutive terms following it in the ordered list at 616, term i is conjoined to the rule r at 618. At 620, after adding the term i to the rule, a determination is made as to whether the rule r is improvable. The determination 620 of whether the rule r is improvable is a second stopping criterion that is met when selecting another potential term for inclusion in the rule r cannot improve a purity or precision of the potential rule. If the rule r is determined to be improvable, at 622, the variables i and j are set equal to one and the process returns to step 608, where a new set of candidate terms are identified, such that another term can be added to the rule r. If rule r is determined to not be improvable, at 624, rule r is output.

As noted above, the example rule generation steps of FIG. 6 may be used as a nested, inner loop within the example iterative rule set generation process of FIG. 5. Thus, after a rule has been generated pursuant to the steps of FIG. 6, it may thereafter be evaluated under the rule evaluation metric of FIG. 5 (i.e., determinations 508, 512) and added to the rule set if the rule evaluation metric is satisfied.

FIG. 7 is a table 700 depicting a generation of a rule set by adding rules one at a time to the rule set. In the table 700 of FIG. 7, each row includes a rule 702, a precision value 704 for the rule set, a recall value 706 for the rule set, and an F1 value 708 for the rule set. Each row of the table 700 represents an addition of the rule 702 to the rule set and the effect that the addition of the rule 702 has on the precision 704, recall 706, and F1 value 708 of the rule set. Pursuant to the example rule set generation steps of FIG. 5, rules 702 that satisfy a rule evaluation metric are added to the rule set one at a time, and a stopping criterion is evaluated after the addition of each rule 702 to determine if the rule set is improvable. In the example of FIG. 7, as each rule 702 is added to the rule set, the precision 704 of the rule set decreases, the recall 706 of the rule set increases, and the F1 score 708 of the rule set increases.

FIG. 8 is a table 800 depicting a number of potential rules 802 for a rule set and a selection 803 of a particular potential rule 804 for the rule set. As discussed above with respect to FIG. 5, a potential rule may be added to the rule set if it satisfies a "k-best" rule evaluation metric, which requires that the particular rule to be added to the rule set be better than k consecutive rules generated subsequent to the generation of the particular rule. The determination of whether the particular rule is better than the k consecutive rules may be based on an F1 score of the rule set including the particular rule, such that the addition of the particular rule cause the rule set to have a higher F1 score than the addition of any of the other k consecutive rules.

The selection 803 of the particular potential rule 804 in FIG. 8 illustrates these concepts. In FIG. 8, the particular potential rule 804 is added to the rule set because, as versus the other potential rules 802, the addition of the particular potential rule 804 improves the F1 score 806 of the rule set the most. Thus, the particular potential rule 804 of FIG. 8 may have satisfied the k-best search strategy, enabling it to be added to the rule set.

FIG. 9 is a table 900 depicting an addition of terms 901 to a rule and a satisfaction of a stopping criterion 902 to discontinue the addition of further terms. As illustrated above with respect to FIG. 6, terms may be conjoined to a rule if they satisfy an "l-best" search strategy, which may require a term to be better than l consecutive terms of an ordered list of key terms. A term may be better than another term if it has a higher term relevancy to one or more data files having a common characteristic, where the term relevancy may be based on a purity or precision of a potential rule including the term. Thus, under such a process, terms are conjoined to the rule one at a time, and after addition of each term, a stopping criterion is evaluated to determine whether the rule could be improved with the addition of another term.

FIG. 9 illustrates the above concepts. In FIG. 9, a first row 904 represents a rule including one term. Subsequent rows 906, 908, 910, 912 illustrate the conjoining of terms to the rule, one term at a time. With the addition of each term, the precision 912 of the rule may increase. After each term is added, the stopping criterion 902 is evaluated. As illustrated in FIG. 9, the stopping criterion may be based on whether the rule can be improved by adding another term. After the addition of the rule of the bottom row 912, the stopping criterion 902 is satisfied because the rule cannot be improved by adding further terms.

Figure 10:
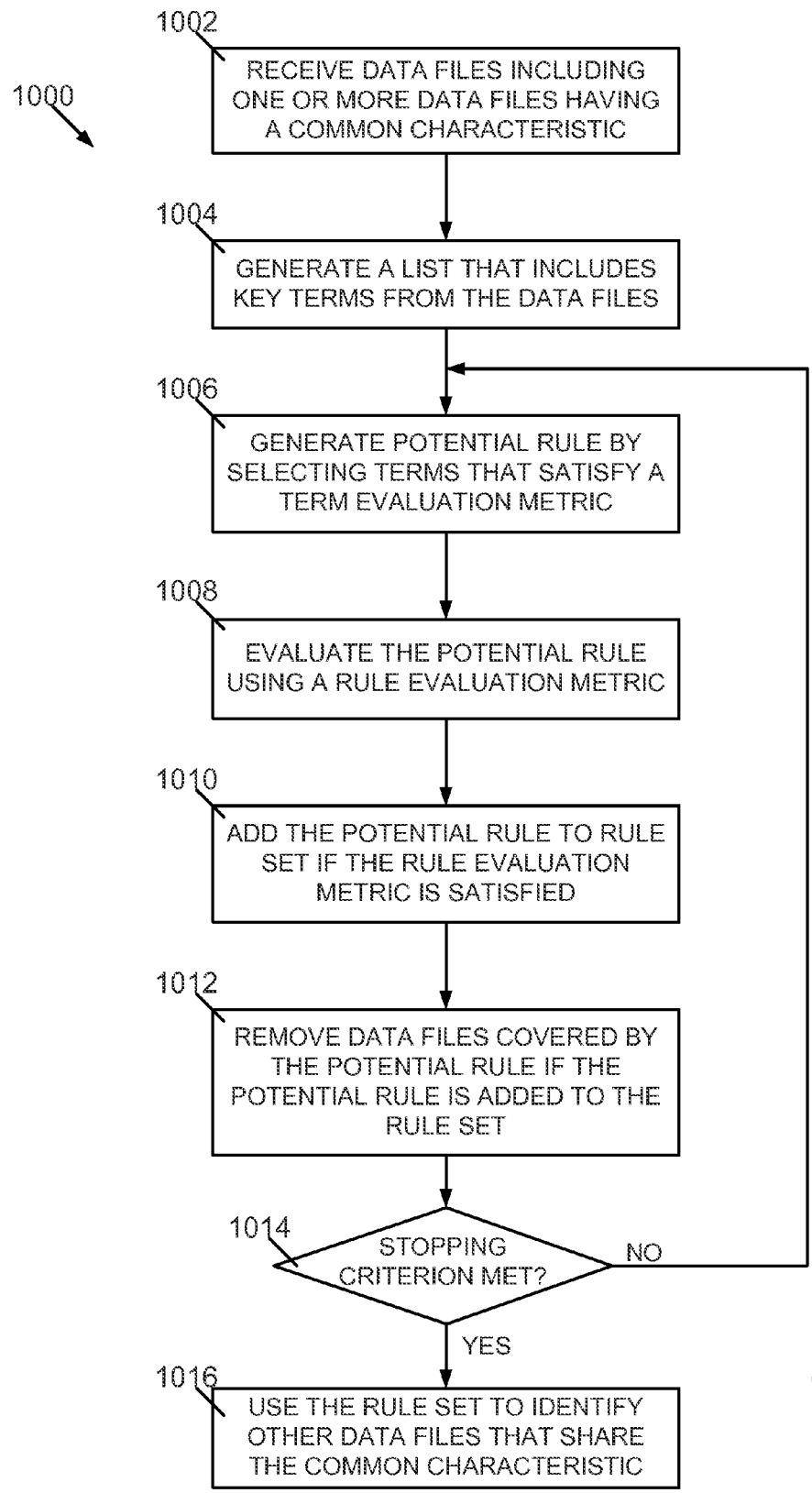
FIG. 10 is a flowchart illustrating an example method for identifying data files that have a common characteristic.

FIG. 10 is a flowchart illustrating an example method for identifying data files that have a common characteristic. At 1002, a plurality of data files are received, where the plurality of data files include one or more data files having a common characteristic. At 1004, a list including key terms from the plurality of data files is generated, and the list is used to generate the rule set. The rule set is generated according to steps 1006 through 1014. At 1006, a potential rule is generated by selecting one or more key terms from the list that satisfy a term evaluation metric. At 1008, the potential rule is evaluated using a rule evaluation metric that determines a relevancy of the potential rule to the one or more data files having the common characteristic. At 1010, the potential rule is added to the rule set if the rule evaluation metric is satisfied. At 1012, data files covered by the potential rule are removed from the plurality of data files if the potential rule is added to the rule set. At 1014, a stopping criterion is evaluated. If the stopping criterion is not met, steps 1006 through 1012 are repeated to add another rule to the rule set. If the stopping criterion is met, at 1016, the rule set is output and used to identify other data files that have the common characteristic.

Figure 11A:
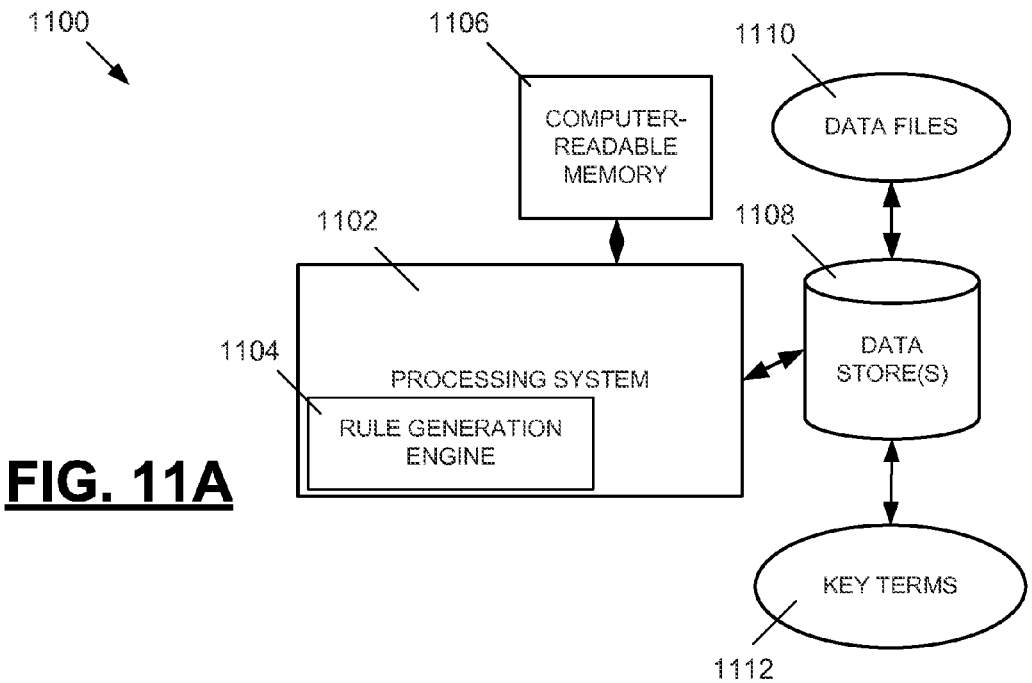
FIGS. 11A, 11B, and 11C depict example systems for use in implementing a rule generation system.
Figure 11B:
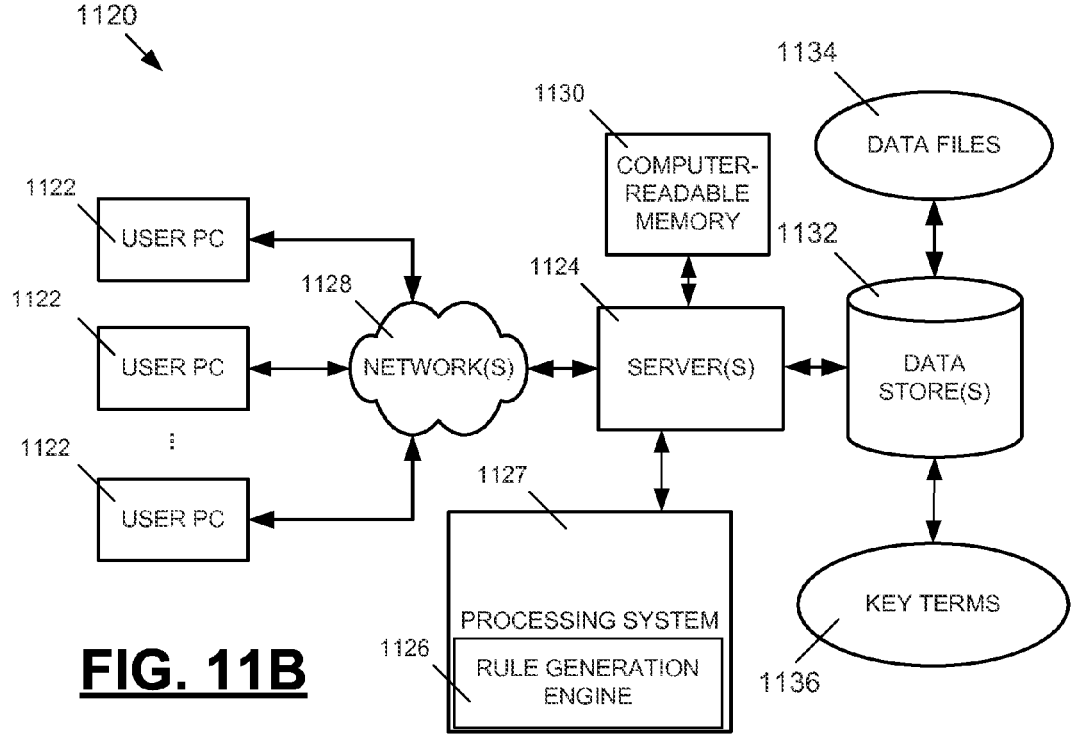
Figure 11C:
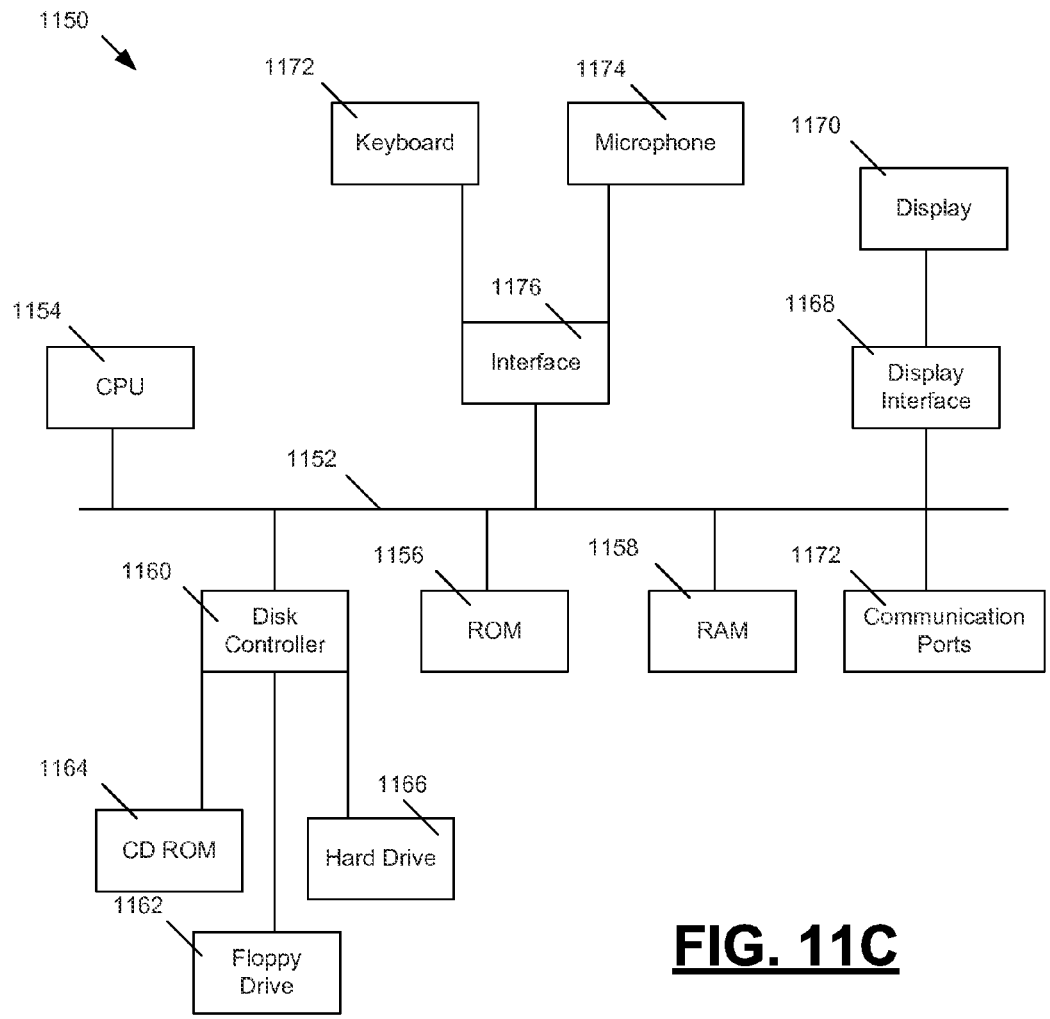

FIGS. 11A, 11B, and 11C depict example systems for use in implementing a rule generation system. For example, FIG. 11A depicts an exemplary system 1100 that includes a standalone computer architecture where a processing system 1102 (e.g., one or more computer processors located in a given computer or in multiple computers that may be separate and distinct from one another) includes a rule generation engine 1104 being executed on it. The processing system 1102 has access to a computer-readable memory 1106 in addition to one or more data stores 1108. The one or more data stores 1108 may include data files 1110 as well as key terms 1112. The processing system 1102 may be a distributed parallel computing environment, which may be used to handle very large-scale data sets.

FIG. 11B depicts a system 1120 that includes a client server architecture. One or more user PCs 1122 access one or more servers 1124 running a rule generation engine 1126 on a processing system 1127 via one or more networks 1128. The one or more servers 1124 may access a computer-readable memory 1130 as well as one or more data stores 1132. The one or more data stores 1132 may contain data files 1134 as well as key terms 1136.

FIG. 11C shows a block diagram of exemplary hardware for a standalone computer architecture 1150, such as the architecture depicted in FIG. 11A that may be used to contain and/or implement the program instructions of system embodiments of the present disclosure. A bus 1152 may serve as the information highway interconnecting the other illustrated components of the hardware. A processing system 1154 labeled CPU (central processing unit) (e.g., one or more computer processors at a given computer or at multiple computers), may perform calculations and logic operations required to execute a program. A non-transitory processor-readable storage medium, such as read only memory (ROM) 1156 and random access memory (RAM) 1158, may be in communication with the processing system 1154 and may contain one or more programming instructions for performing the method of generating a rule set. Optionally, program instructions may be stored on a non-transitory computer-readable storage medium such as a magnetic disk, optical disk, recordable memory device, flash memory, or other physical storage medium.

A disk controller 1160 interfaces one or more optional disk drives to the system bus 1152. These disk drives may be external or internal floppy disk drives such as 1162, external or internal CD-ROM, CD-R, CD-RW or DVD drives such as 1164, or external or internal hard drives 1166. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 1160, the ROM 1156 and/or the RAM 1158. Preferably, the processor 1154 may access each component as required.

A display interface 1168 may permit information from the bus 1152 to be displayed on a display 1170 in audio, graphic, or alphanumeric format. Communication with external devices may optionally occur using various communication ports 1172.

In addition to these computer-type components, the hardware may also include data input devices, such as a keyboard 1173, or other input device 1174, such as a microphone, remote control, pointer, mouse and/or joystick.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein and may be provided in any suitable language such as C, C++, JAVA, for example, or any other suitable programming language. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalents.

It should be understood that as used in the description herein and throughout the claims that the meaning of "in" includes "in" and "on" unless the context clearly dictates otherwise. Further, as used in the description herein and throughout the claims that follow, the meaning of "each" does not require "each and every" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive of" may be used to indicate situations where only the disjunctive meaning may apply.

It is claimed:

1. A computer-implemented method for identifying data files that have a common characteristic, the method comprising:
   receiving a plurality of data files, the plurality of data files including one or more data files having the common characteristic;
   generating, using one or more processors, a list that includes key terms from the plurality of data files;
   using the list to generate a rule set, the rule set being generated using the one or more processors by:
      generating a potential rule by selecting one or more key terms from the list that satisfy a term evaluation metric;
      evaluating the potential rule using a rule evaluation metric configured to determine a relevancy of the potential rule to the one or more data files having the common characteristic, the rule evaluation metric being further configured to determine an applicability of the potential rule to data not included in the plurality of data files;
      adding the potential rule to the rule set if the rule evaluation metric is satisfied;
      based upon the potential rule being added to the rule set, removing data files covered by the potential rule from the plurality of data files; and
      repeating the potential rule generation and evaluation until a stopping criterion is met; and
   after the stopping criterion has been met, identifying with the rule set, other data files that have the common characteristic using the one or more processors.

2. The method of claim 1, wherein generating the potential rule by selecting one or more key terms from the list that satisfy the term evaluation metric includes:
   identifying a potential term from the list;
   evaluating the potential term using the term evaluation metric;
   selecting the potential term for inclusion in the potential rule if the term evaluation metric is satisfied; and
   repeating the key term selection until a second stopping criterion is met, wherein a next potential term to be identified follows the identified potential term in the list.

3. The method of claim 2, wherein meeting the second stopping criterion comprises:
   determining that selecting another potential term for inclusion in the potential rule cannot improve a precision or purity of the potential rule.

4. The method of claim 1, comprising:
   receiving the plurality of data files, the plurality of data files including one or more data files that do not have the common characteristic.

5. The method of claim 1, wherein the common characteristic is a category or a classification.

6. The method of claim 1, further comprising encoding the plurality of data files in a sparse data format.

7. The method of claim 1, wherein satisfying the rule evaluation metric comprises:
   determining that the potential rule has a higher rule relevancy to the one or more data files having the common characteristic than a predetermined number of other potential rules, the rule relevancy of the potential rule being based on a precision and a recall of a rule set including the potential rule.

8. The method of claim 7, further comprising:
   generating the predetermined number of other potential rules subsequent to the generation of the potential rule; and
   comparing the predetermined number of other potential rules to the potential rule consecutively, in order of a time of generation of the other potential rules.

9. The method of claim 7, wherein satisfying the rule evaluation metric comprises:
   determining that the potential rule has a higher rule relevancy to the one or more data files having the common characteristic than the predetermined number of other potential rules, the rule relevancy of the potential rule being based on an F1 score of the rule set including the potential rule, and the F1 score being a harmonic mean of the precision and the recall.

10. The method of claim 9, wherein satisfying the term evaluation metric comprises:
    determining that the potential term has a higher term relevancy to the one or more data files having the common characteristic than a predetermined number of other potential terms, the term relevancy of the potential term being based on a precision or purity of the potential rule including the potential term.

11. The method of claim 10, wherein the predetermined number of other potential terms immediately follow the potential term in the ordered list.

12. The method of claim 1, further comprising:
    ordering the key terms of the list based on a relevance of the key terms to the common characteristic.

13. The method of claim 12, comprising:
    ordering the key terms of the list based on the relevance of the key terms to the common characteristic, the relevance of the key terms to the common characteristic being based on an information gain or g-score.

14. The method of claim 1, wherein meeting the stopping criterion comprises:
    determining that adding another potential rule to the rule set cannot increase a harmonic mean of precision and recall of the rule set.

15. The method of claim 1, comprising using the list to generate the rule set, the rule set having a disjunctive normal form.

16. The method of claim 15, wherein using the list to generate the rule set comprises:

linking the potential rules of the rule set by "OR" operators; and linking the selected key terms of each rule by "AND" operators.

17. The method of claim 1, comprising:

receiving the plurality of data files, the plurality of data files being text documents; and generating the list that includes the key terms, the key terms being words, phrases, sentences, or symbols.

18. The method of claim 17, further comprising:

using the rule set to perform text categorization or generate search strings for a search engine.

19. The method of claim 1, comprising:

receiving the plurality of data files, the plurality of data files including biological data; and generating the list that includes the key terms, the key terms including DNA data, RNA data, or genomic data.

20. The method of claim 19, further comprising:

using the rule set to make a determination as to whether an individual is likely to develop a particular medical condition.

21. The method of claim 1, comprising:

receiving the plurality of data files, the plurality of data files including economic data; and generating the list that includes the key terms, the key terms including purchasing data, stock market data, financial data, loan data, or credit history data.

22. The method of claim 21, further comprising:

using the rule set to make a determination as to whether an individual is likely to purchase an item or default on a loan.

23. The method of claim 1, further comprising:

using a human to determine the common characteristic of the one or more data files.

24. The method of claim 1, further comprising:

using a computer to determine the common characteristic of the one or more data files.

25. The method of claim 1, comprising adding the potential rule to the rule set, the potential rule covering a predetermined number of the plurality of data files.

26. A system for generating a rule set to identify data files that have a common characteristic, the system comprising:

one or more processors;

one or more non-transitory computer-readable storage mediums containing instructions configured to cause the one or more processors to perform operations including:

receiving a plurality of data files, the plurality of data files including one or more data files having the common characteristic;

generating a list that includes key terms from the plurality of data files;

using the list to generate a rule set, the rule set being generated by:

generating a potential rule by selecting one or more key terms from the list that satisfy a term evaluation metric;

evaluating the potential rule using a rule evaluation metric configured to determine a relevancy of the potential rule to the one or more data files having the common characteristic, the rule evaluation metric being further configured to determine an applicability of the potential rule to data not included in the plurality of data files;

adding the potential rule to the rule set if the rule evaluation metric is satisfied;

based upon the potential rule being added to the rule set, removing data files covered by the potential rule from the plurality of data files; and repeating the potential rule generation and evaluation until a stopping criterion is met; and after the stopping criterion has been met, identifying with the rule set, other data files that have the common characteristic.

27. A machine-readable non-transitory storage medium that provides a computer-program product for generating a rule set to identify data files that have a common characteristic, the storage medium including instructions configured to cause a data processing system to:

receive a plurality of data files, the plurality of data files including one or more data files having the common characteristic;

generate a list that includes key terms from the plurality of data files;

use the list to generate a rule set, the rule set being generated by:

generating a potential rule by selecting one or more key terms from the list that satisfy a term evaluation metric;

evaluating the potential rule using a rule evaluation metric configured to determine a relevancy of the potential rule to the one or more data files having the common characteristic, the rule evaluation metric being further configured to determine an applicability of the potential rule to data not included in the plurality of data files;

adding the potential rule to the rule set if the rule evaluation metric is satisfied;

based upon the potential rule being added to the rule set, removing data files covered by the potential rule from the plurality of data files; and repeating the potential rule generation and evaluation until a stopping criterion is met; and after the stopping criterion has been met, identify with the rule set, other data files that have the common characteristic.

* * * * *